(12) United States Patent
Yamazaki et al.

(10) Patent No.: US 7,160,481 B2
(45) Date of Patent: Jan. 9, 2007

(54) METHOD FOR MANUFACTURING MAGNETIC PAINT, AND MAGNETIC RECORDING MEDIUM

(75) Inventors: Katsuhiko Yamazaki, Tokyo (JP); Tsutomu Ide, Tokyo (JP); Hiroyuki Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/765,139

(22) Filed: Jan. 28, 2004

(65) Prior Publication Data

US 2004/0185303 A1 Sep. 23, 2004

(30) Foreign Application Priority Data

Jan. 28, 2003 (JP) .............................. 2003-018540

(51) Int. Cl.
*G11B 5/842* (2006.01)

(52) U.S. Cl. ................................. 252/62.54; 252/62.53

(58) Field of Classification Search ..................... None
See application file for complete search history.

(56) References Cited

U.S. PATENT DOCUMENTS

| | | | |
|---|---|---|---|
| 3,836,395 A * | 9/1974 | Roller et al. ................. | 427/548 |
| 4,568,612 A * | 2/1986 | Lehner et al. ............ | 428/425.9 |
| 5,169,721 A * | 12/1992 | Bobrich et al. ........... | 428/425.9 |
| 6,548,160 B1 * | 4/2003 | Naoe et al. .................. | 428/328 |
| 2004/0013795 A1 * | 1/2004 | Yamazaki et al. ........... | 427/128 |

FOREIGN PATENT DOCUMENTS

| | | | |
|---|---|---|---|
| JP | 60-211637 | | 10/1985 |
| JP | 64-057422 | | 3/1989 |
| JP | 01-290122 | | 11/1989 |
| JP | 2000-339678 | * | 12/2000 |
| JP | 2001-081406 | | 3/2001 |
| JP | 2001-81406 | * | 3/2001 |

OTHER PUBLICATIONS

U.S. Appl. No. 11/346,320, filed Feb. 3, 2006, Yamazaki et al.

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

A method for manufacturing magnetic paint is provided, wherein a dispersion condition is appropriately controlled to excellently disperse a magnetic powder composed of fine particles adaptable for a higher recording density, so that magnetic paint having excellent dispersibility can be prepared, and a magnetic recording medium having excellent surface roughness is provided. The magnetic paint is prepared by the step of subjecting a mixed solution containing at least a binder, a solvent, and a magnetic powder to a dispersion treatment with a dispersion device by the use of dispersion media through at least dispersion step, wherein the dispersion in the main dispersion step is carried out by the use of dispersion media having an average particle diameter y (mm) satisfying the relationship, which is represented by formula $y \leq 0.01x$, with the average maximum diameter x (nm) of the magnetic powder.

8 Claims, 4 Drawing Sheets

METHOD FOR MANUFACTURING MAGNETIC PAINT, AND MAGNETIC RECORDING MEDIUM

BACKGROUND OF THE INVENTION

1. Field of the Invention

The present invention relates to a method for manufacturing magnetic paint and a magnetic recording medium. In particular, the present invention relates to a method for manufacturing magnetic recording medium, wherein a dispersion condition during the dispersion through the use of a dispersion device filled in with dispersion media is improved in order to excellently disperse a magnetic powder composed of fine particles adaptable for a higher recording density, so that a magnetic recording medium having excellent surface roughness can be prepared, and to a magnetic recording medium provided through the use of the magnetic paint (hereafter may be referred to as "paint") prepared by the method.

2. Description of the Related Art

In general, magnetic paint for manufacturing a magnetic recording medium is prepared through the steps of supplying a magnetic paint composition composed of a magnetic powder, a binder, an organic solvent, and other necessary components to a dispersion device in which dispersion media, e.g., glass beads, are filled in a mixing vessel, forcedly agitating the composition together with the dispersion media with an agitator disposed in the mixing vessel, and the like.

On the other hand, with respect to magnetic recording media used for videos, audio equipment, computers, or the like, increases in recording density have even more advanced in recent years. Consequently, the minimum recording unit tends to be miniaturized by reducing the recording wavelength, decreasing the recording track width, and decreasing the recording medium thickness. In order to deal with this, a ferromagnetic metal powder, which is composed of fine particles and which has large magnetic energy, has become used as the magnetic powder.

In the magnetic recording medium, it is important that the magnetic powder has adequate dispersibility in the magnetic paint and the magnetic layer provided has a good surface roughness to attain a high playback output and an excellent S/N ratio of the short-wavelength recording. Therefore, various researches have been carried out on the improvement of the dispersibility of the magnetic powder in the magnetic paint until now. For example, technologies related to materials for dispersion media are described in, e.g., Japanese Unexamined Patent Application Publication No. 60-211637, Japanese Unexamined Patent Application Publication No. 64-57422, and Japanese Unexamined Patent Application Publication No. 1-290122. Technologies related to dispersion conditions, such as the amount of filling of the dispersion media in the dispersion step, are described in, for example, Japanese Unexamined Patent Application Publication No. 2000-339678. Furthermore, there have been proposed the technology for preparing magnetic paint and a magnetic recording medium, each having excellent medium characteristics, by improving the dispersion condition related to the preparation of magnetic paint in Japanese Unexamined Patent Application Publication No. 2001-81406.

Accompanying the reduction in the particle size of the magnetic powder, establishment of an adequate degree of dispersion becomes difficult unless dispersion media having smaller diameters are used. However, since the weight per dispersion medium is decreased with a decrease in the diameter of the medium, an adequate collision force may not be attained, so that a problem of an inadequate degree of dispersion may occur.

SUMMARY OF THE INVENTION

Accordingly, it is an object of the present invention to provide a method for manufacturing magnetic paint, wherein a dispersion condition is appropriately controlled in order to excellently disperse a magnetic powder composed of fine particles adaptable for a higher recording density, so that magnetic paint having excellent dispersibility can be prepared, and to provide a magnetic recording medium having excellent surface roughness.

In order to overcome the above-described problems, the present invention relates to a method for manufacturing magnetic paint comprising the step of subjecting a mixed solution containing at least a binder, a solvent, and a magnetic powder to a dispersion treatment with a dispersion device by the use of dispersion media through a main dispersion step, wherein the dispersion in the main dispersion step is carried out by the use of dispersion media having an average particle diameter y (mm) satisfying the relationship, which is represented by the following formula:

$$y \leq 0.01x,$$

with the average maximum diameter x (nm) of the magnetic powder, so as to prepare the magnetic paint.

Here, the maximum diameter means a such diameter that when a circle is drawn by regarding a line between one edge of the magnetic powder and the other as a diameter, the resulting circle becomes largest. Therefore, a major-axis length for an acicular ferromagnetic metal powder, a plate diameter for a plate magnetic powder such as BaFe and a diameter for a spherical magnetic powder correspond to the maximum diameter, respectively. For example, the average of 100 magnetic powder (n=100) can be adopted.

In the manufacturing method of the present invention, preferably, the above-described magnetic powder has a maximum diameter of 100 nm or less. Preferably, a preliminary dispersion step is included in addition to the main dispersion step. Preferably, the dispersion media used in the above-described main dispersion step have an average particle diameter y of 0.8 mm or less. Preferably, the paint concentration of the above-described mixed solution is within the range of 5 to 20 percent by mass in terms of a solid concentration during the above-described main dispersion step.

A magnetic recording medium of the present invention includes a magnetic layer provided on a non-magnetic support directly or with a non-magnetic layer therebetween, wherein the magnetic layer is formed through application of the magnetic paint prepared by the above-described manufacturing method according to the present invention.

According to the present invention, a dispersion condition is appropriately controlled to excellently disperse a magnetic powder composed of fine particles adaptable for a higher recording density so that magnetic paint having excellent dispersibility can be prepared, and by using this, a magnetic recording medium having excellent surface roughness can be realized.

DESCRIPTION OF THE PREFERRED EMBODIMENTS

Specific embodiments of the present invention will be described below with reference to the drawings.

Figure 1:
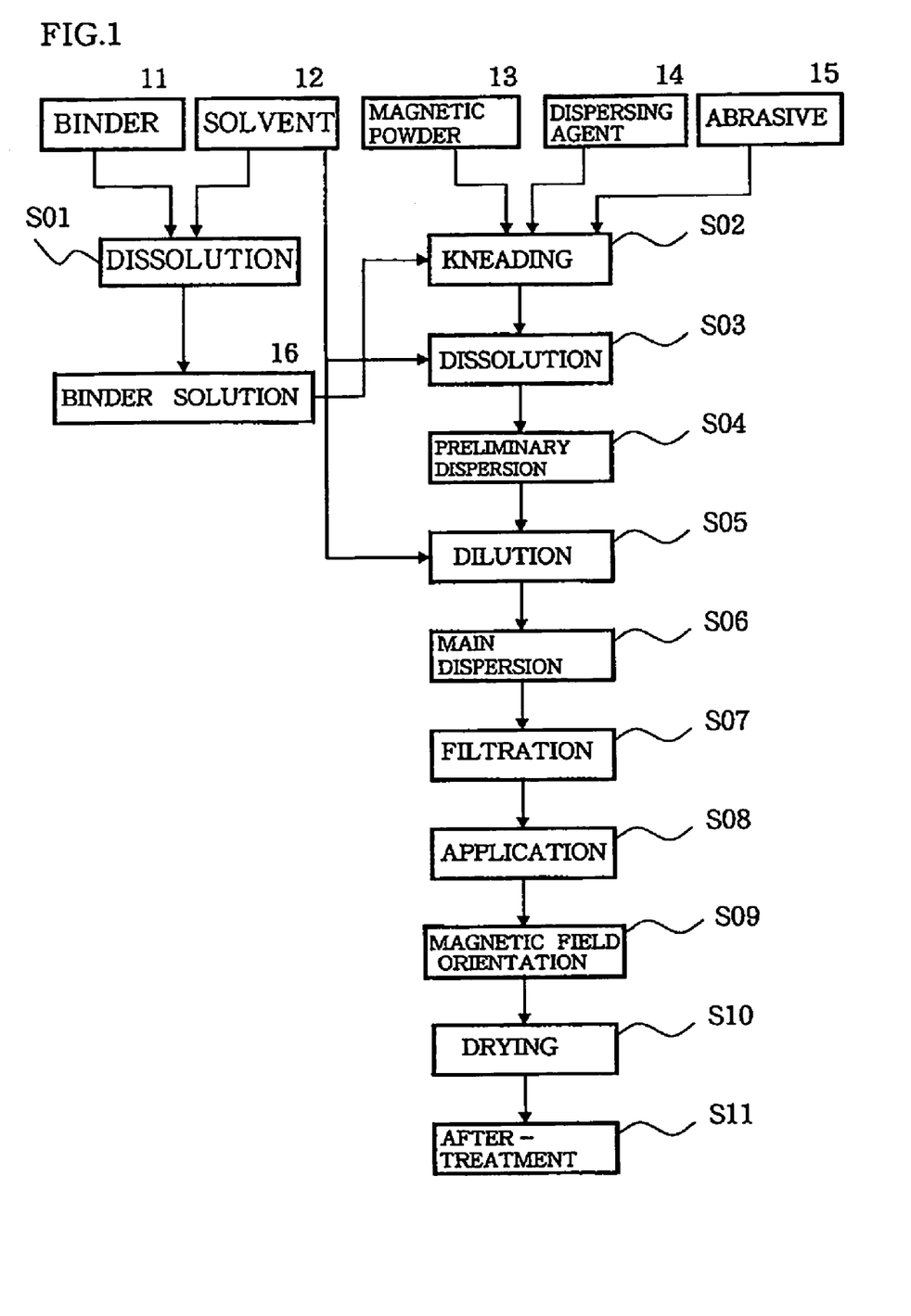
FIG. 1 is a flow chart showing an example of a paint preparation process of a paint composition in the manufacture of magnetic paint.

As described above, the magnetic paint of the magnetic recording medium is composed of a magnetic powder, a binder, a solvent, and others, such as an additive. FIG. 1 shows a flow chart of a preferred example of a paint preparation process of such a paint composition in the manufacture of the magnetic paint.

As shown in the drawing, in the manufacture of the paint, a binder 11, a solvent 12, a magnetic powder 13, a dispersing agent 14, an abrasive 15, and the like are sequentially blended, and paint is prepared through the steps of kneading, dissolution, dispersion and the like. The components of the paint according to the present invention essentially includes at least the magnetic powder, the binder, and the solvent. If necessary, the dispersing agent, the abrasive, and the like may appropriately be added. In the present invention, a dispersion condition during a main dispersion step (S06 in the drawing) carried out following a preliminary dispersion step (S04 in the drawing) in the paint preparation process is appropriately determined and, thereby, excellent dispersibility can be realized with respect to even a magnetic powder composed of fine particles.

Specifically, the mixed solution is subjected to a dispersion treatment during the main dispersion step (S06) under a dispersion condition in which the dispersion media used have an average particle diameter y (mm) satisfying the relationship, which is represented by the following formula:

$$y \leq 0.01x,$$

preferably, the following formula:

$$y \leq 0.008x,$$

with the average maximum diameter x (nm) of the magnetic powder used. When the main dispersion treatment is carried out in accordance with the above-described dispersion condition, excellent dispersion state in the mixed solution can be established with respect to even the magnetic powder composed of fine particles, and excellent surface roughness can be realized with respect to a magnetic layer formed from finally prepared magnetic paint. If dispersion media used in the main dispersion step have an average particle diameter y (mm) that does not satisfy the relationship, which is represented by the above-described formula, with the average maximum diameter x (nm) of the magnetic powder, the magnetic powder is not adequately loosened to have a primary particle diameter and, therefore, the desired effects of the present invention cannot be achieved.

Specifically, the dispersion media having an average particle diameter y of 0.8 mm or less are suitable for use in the above-described main dispersion step (S06). In the main dispersion step (S06), the mixed solution having been subjected to the preliminary dispersion step (S04) in a high concentration state is subjected to a dispersion treatment. A suitable paint concentration of the mixed solution is within the range of 5 to 20 percent by mass in terms of a solid concentration. In this manner, paint suitable for forming a magnetic layer can be prepared by the combination of the mixed solution and the dispersion media satisfying the above-described condition and, in particular, a thin film magnetic recording medium is thereby manufactured with advantage. If the solid concentration is too high, the dispersion media having an average particle diameter satisfying the above-described formula cannot adequately exert the ability to enhance dispersion because the average particle diameter is small, the mass of the particle is small correspondingly and, thereby, the movement of the particle is hindered. Consequently, the magnetic powder is resistant to adequate loosening to the primary particle diameter. Furthermore, the pressure of the paint tends to become high, and problems of facility occur in that the flow rate cannot be increased and the like.

Here, solids of the solid concentration means various additives other than organic solvent, such as magnetic powder, binder resin, dispersant and the like, and the solid concentration is defined as 100×solids/(solids+organic solvent).

The filling factor, the dispersion circumference velocity, and the residence time of the dispersion media during the main dispersion step (S06) may appropriately be controlled in accordance with the average particle diameter of the dispersion media, and are not specifically limited. For example, even when the dispersion circumference velocity and the filling factor are different from predetermined values, by taking an adequate residence time, finally, the magnetic powder can be dispersed to the degree in accordance with the average particle diameter of the dispersion media used. In general, when the diameters of the dispersion media are decreased, preferably, the filling factor and the dispersion circumference velocity are increased in order to complement the decrease in the collision energy due to the decrease in the mass of the dispersion medium. For example, when the average particle diameter y of the dispersion media is 0.8 mm or less, the filling factor may be about 70 to 90 percent. If the filling factor is less than 70 percent, it will take much time to carry out the dispersion. On the other hand, if exceeds 90 percent, the amount of the mixed solution put in is decreased and, thereby, the efficiency tends to be lowered. Here, the filling factor is defined as 100V1/(V2+V3), wherein an apparent volume when the dispersion media are put in a vessel is represented by V1, the true volume of the dispersion media is represented by V2, and the volume of the mixed solution in the vessel is represented by V3.

Preferably, the dispersion circumference velocity is about 8 to 15 m/s. If the velocity is too large, the heat generation of the dispersion device and the paint become large and, in addition, breaks of the non-magnetic powder and the magnetic powder tend to occur. On the other hand, when the velocity is too small, pigments tend to become resistant to adequate loosening to the primary particle diameter. The residence time may appropriately be controlled in accordance with the average particle diameter, the filling factor, and the dispersion circumference velocity of the dispersion media. For example, the paint is applied, the gloss of the coating film and the like are measured as a guideline of the degree of dispersion, and the time that fully reaches saturation of the gloss may be taken as the residence time. The residence time may be about 5 to 30 minutes with respect to a dispersion device including a vessel having a capacity of 4 liters.

A preferred example of the method for manufacturing paint of the present invention will be specifically described below step by step with reference to the flow chart shown in FIG. 1.

The binder 11 made of resin material or the like is dissolved in the solvent 12 so as to prepare a binder solution 16 (S01). The resulting binder solution 16, the magnetic powder 13, the dispersing agent 14, and the abrasive 15 are kneaded (S02), and are dissolved by adding the solvent 12 (S03), so as to prepare a mixed solution containing at least the binder 11, the magnetic powder 13, and the solvent 12. Here, known methods can appropriately be used as a method for manufacturing such a mixed solution. For example, after the materials are kneaded with a continuous kneader, a pressure kneader, or the like, agitation and dissolution are carried out in a dissolver or the like while a solvent is added, so that the mixed solution can be prepared. The order of mixing of the materials is not specifically limited to that in the example shown in the drawing.

The thus prepared mixed solution is supplied into a vessel of the dispersion device, while a predetermined filling amount of dispersion media have been put in the vessel beforehand, and an agitator, which is disposed in the vessel and which is provided with a plurality of agitation disks, agitation blades, agitation pins, or the like, is rotated at a predetermined circumferential velocity, so that a preliminary dispersion treatment is carried out (S04). In this preliminary dispersion treatment (S04), a high-concentration paint is subjected to a dispersion treatment in order that the number of collisions between agglomerations and the dispersion media is increased for the purpose of loosening the agglomerations since the mixed solution prepared by kneading of the binder, the magnetic powder, and the solvent generally includes large agglomerations. In the present invention, the paint is thereby allowed to become in the uniform dispersion state and, thereafter, the paint is diluted to decrease the concentration in order that light-mass dispersion media, which have small particle diameters and which are to be used in the main dispersion treatment; can move about in the paint to an adequate degree for exerting the dispersion ability. Subsequently, the main dispersion step is carried out.

With respect to the preliminary dispersion treatment, it is essential that the magnetic powder can appropriately be dispersed in the mixed solution of high concentration (for example, about 25 to 40 percent by mass in terms of solid concentration). The treatment conditions thereof may be known dispersion conditions, and are not specifically limited. For example, the treatment may be carried out with a dispersion device including a vessel having a capacity of 4 liters by the use of dispersion media having an average particle diameter in the order of 0.8 mm at a dispersion circumferential velocity in the order of 8 m/s for a residence time in the order of 30 minutes. Preferably, the filling factor of the dispersion media is 55 to 85 percent.

The solvent is added to the mixed solution containing the magnetic powder 13 preliminary dispersed, as described above, so that the above-described desired paint concentration is attained by dilution (S05). Subsequently, the above-described main dispersion treatment is carried out (S06). Here, the paint concentration is not necessarily controlled at a final concentration in this dilution step (S05). In order to improve the stability of the paint with time or to attain desired suitability for application, further dilution may be carried out during or after the main dispersion step (S06), or dilution may be carried out immediately before the application.

Furthermore, after this main dispersion treatment (S06), filtration is carried out with a filter (S07), so that magnetic paint can be prepared. With respect to the filtration conditions, preferably, the filtration is carried out with a filter having a 100 percent-filtration accuracy of higher than 2.0 µm, for example. Foreign matters larger than 2.0 µm tend to cause large errors during playback of the record and, preferably, those are removed.

With respect to a procedure of the formation of a magnetic layer by applying the magnetic paint prepared as described above, the magnetic paint is applied to a non-magnetic support directly or with a non-magnetic layer therebetween (S08) and, thereafter, a magnetic field orientation treatment to align the directivity of the magnetic powder is carried out by passing through the magnetic field while adequate fluidity remains (S09). After a drying treatment is carried out in which the solvent is vaporized so as to bring about a solid state (S10), a calendering treatment of the surface to improve the surface property and to improve the state of the packing of the magnetic powder, and after-treatments, such as cutting into a desired shape, are carried out (S11), so that the magnetic layer can be formed. The above-described calendering treatment of the surface is carried out by passing the magnetic recording medium between metal rolls and elastic rolls disposed alternately or between metal rolls at a predetermined temperature under the condition in which a pressure is applied.

The magnetic recording medium of the present invention may be manufactured through the formation of the magnetic layer on the non-magnetic support by application in accordance with the above-described procedure. If necessary, a back coating layer may be provided on a surface opposite to the surface, on which the non-magnetic layer and the magnetic layer have been provided, of the non-magnetic support.

Figure 2:
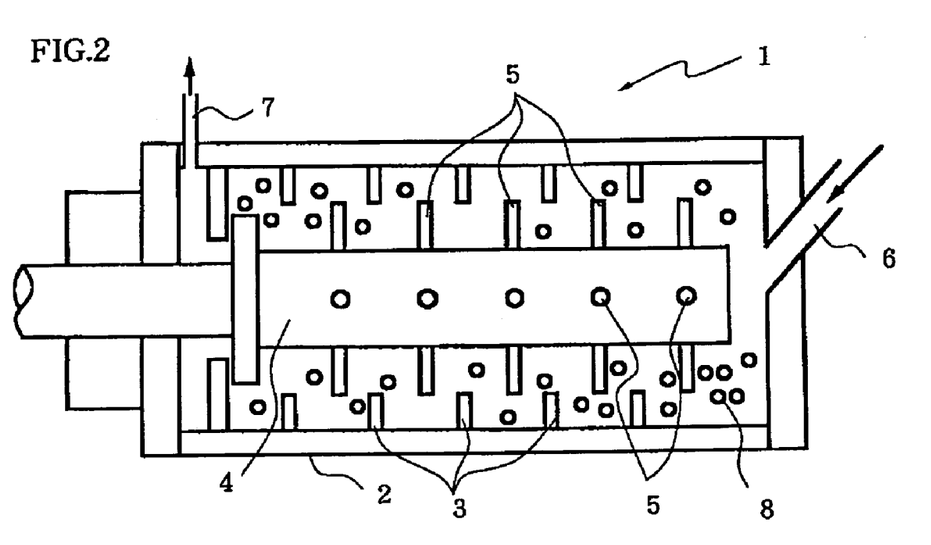
FIG. 2 is a schematic sectional view showing a pin-type mill as an example of a dispersion device.

Typical examples of the dispersion device used in the present invention may include a pin-type mill and a sand mill. Since the pin-type mill readily transfers the rotational energy to the dispersion media because of the structure described below, the pin-type mill is suitable for the use, in particular, with respect to dispersion media having smaller diameters. FIG. 2 is a schematic sectional view showing an example of this pin-type mill. As shown in the drawing, the pin-type mill 1 serving as a dispersion device is provided with a horizontal, cylindrical vessel 2 for containing the mixed solution of paint components, a plurality of first pins 3 fixed to the inner wall of the vessel 2 while protruding in the radius direction, a rotating shaft 4 which is also provided with a plurality of protruding second pins 5 and which is driven to rotate by a motor (not shown in the drawing), a mixed solution inlet 6 provided on the vessel 2, and a mixed solution outlet 7. When a dispersion treatment is carried out, dispersion media (beads) 8 are filled in the vessel 2 of the pin-type mill 1, as shown in the drawing.

The second pins 5 are provided in the radius direction of the rotating shaft 4, and the second pins 5 and the first pins 3 protruding from the inner wall of the vessel 2 are alternately arranged in the rotation axis direction at appropriate spacings while the end portion of the pins are configured to overlap in the radius direction. These first pins 3 and second pins 5 serve as agitation pins and, therefore, constitute the agitator which is operated by the rotation of the rotating shaft 4. Here, the rotation speed at the end of the second pin 5 in the dispersion circumferential velocity of this agitator, that is, the pin-type mill 1 serving as the dispersion device.

The mixed solution to be subjected to the dispersion treatment is supplied into the vessel through the inlet 6. The mixed solution is subjected to the dispersion treatment with the dispersion media 8 in the vessel 2 of the dispersion device while being passed between the fixed first pins 3 and the rotating second pins 5, and is discharged through the outlet 7. In this case, in order to establish adequate dispersibility, the mixed solution discharged may be supplied again into the vessel 2 through the inlet 6 (hereafter referred to as "recycled supply"). Alternatively, a plurality of pin-type mills 1 may be disposed in series and in multiple stages, and the mixed solution may sequentially be subjected to dispersion treatments with these devices.

Figure 3A:
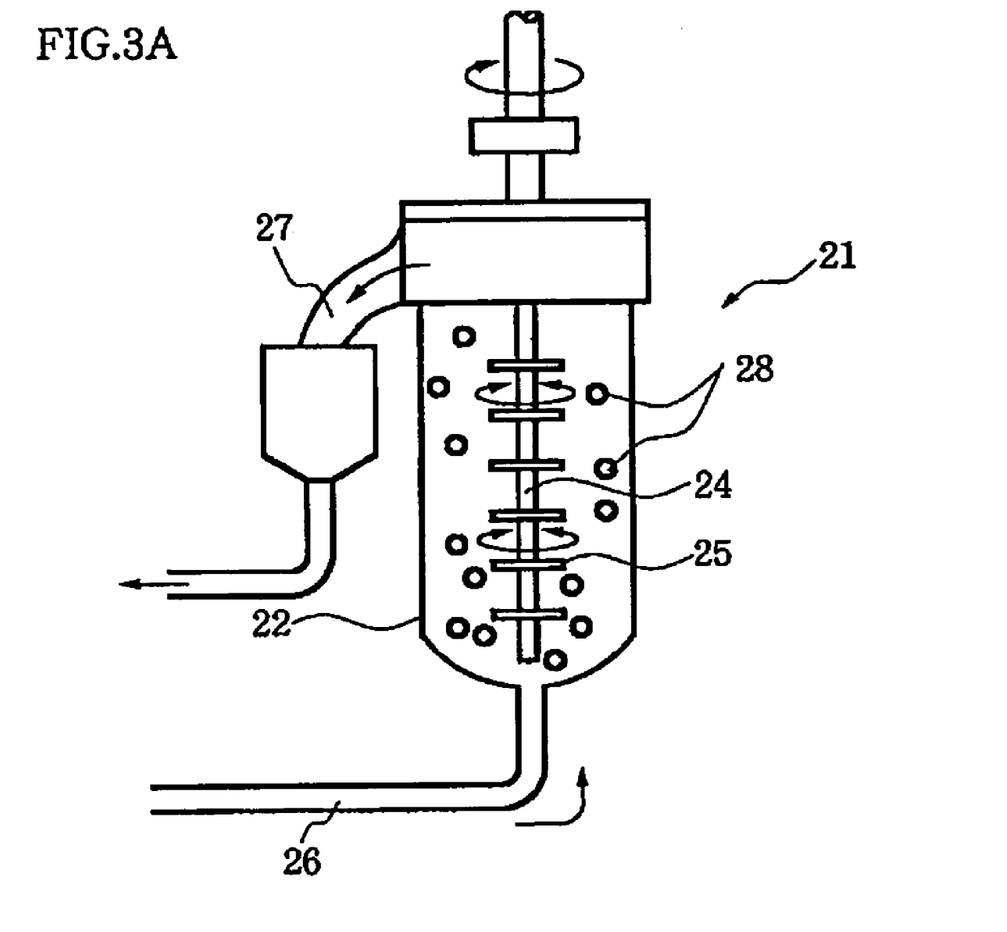
FIG. 3A is a schematic sectional view showing a sand mill as an example of a dispersion device.

FIG. 3A is a schematic sectional view showing a sand mill as another example of the dispersion device. The sand mill 21 shown in the drawing is provided with a vertical, cylindrical vessel 22 for containing the mixed solution, a rotating shaft 24 which is provided with a plurality of protruding rotating disks 25 and which is driven to rotate by a motor (not shown in the drawing), a mixed solution inlet 26 provided on the vessel 22, and a mixed solution outlet 27, and dispersion media (beads) 28 are filled in the vessel 22, as in the pin-type mill 1.

Figure 3B:
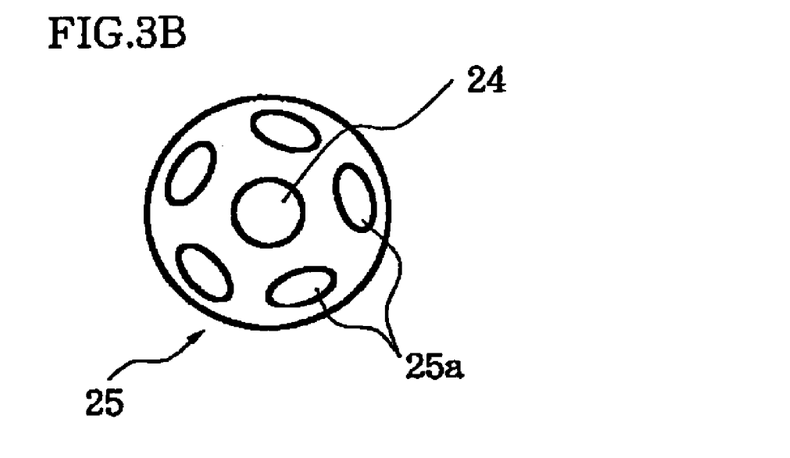
FIG. 3B is a plan view showing a rotating disk of the sand mill.

As shown by the plan view in FIG. 3B, the rotating disk 25 is configured to have the shape of a circular plate, and has a plurality of holes 25*a*. The mixed solution fed with a pump or the like through the inlet 26 is subjected to the dispersion treatment with the dispersion media 28 in the vessel 22 of the dispersion device while being agitated with the plurality of rotating disks 25, and is discharged through the outlet 27.

In these dispersion device, the dispersion media filled in the vessels are agitated with pins or disks accompanying the rotations of the rotating shafts and, thereby, are allowed to have the kinetic energy. Here, the pin-type mill 1 shown in FIG. 2 and the sand mill (rotating disk type) shown in FIG. 3 will be compared. As described above, in the pin-type mill shown in FIG. 2, the second pins 5 and the first pins 3 are configured to overlap and, therefore, all dispersion media are allowed to have the kinetic energy by the pins. On the other hand, in the rotating-disk-type shown in FIG. 3, since there is a space between the perimeter of the disk and the inner wall of the vessel, the kinetic energy caused by the rotation of the disks resists being transferred to dispersion media present in this portion and, therefore, the paint passing through this portion resists being subjected to the dispersion treatment.

The dispersion device may be an annular-type mill or other dispersion devices including an agitator built in a mixing vessel, besides the above-described pin-type mill and sand mill, and is not specifically limited. The agitator may be agitation disks, agitation blades, agitation pins, or the like, as described above.

Dispersion media must have the above-described particle diameters, but other conditions, such as a material, are not specifically limited. However, ceramic is preferable and, in particular, zirconia is more preferable from the viewpoint of the abrasion resistance. The dispersion media to be used are in the shape of beads having small diameters. Preferably, the specific gravity of the dispersion media is 2.0 g/cc to 6.5 g/cc and, more preferably, is 3.8 g/cc to 6.0 g/cc.

With respect to the magnetic recording medium of the present invention, constituent materials and the like of the magnetic recording medium are not specifically limited as long as the above-described conditions related to the dispersion treatment in the paint preparation step are satisfied. For example, the following materials may be used.

Examples of magnetic powders include known magnetic metal powders primarily containing Fe, Ni, or Co, for example, $\gamma\text{-Fe}_2\text{O}_3$, $\text{Fe}_3\text{O}_4$, solid solutions of $\gamma\text{-Fe}_2\text{O}_3$ and $\text{Fe}_3\text{O}_4$, Co compound-adhesion $\gamma\text{-Fe}_2\text{O}_3$, Co compound-doped $\gamma\text{-Fe}_2\text{O}_3$, Co compound-adhesion $\text{Fe}_3\text{O}_4$, Co compound-doped $\text{Fe}_3\text{O}_4$, solid solutions of Co compound-adhesion $\gamma\text{-Fe}_2\text{O}_3$ and Co compound-adhesion $\text{Fe}_3\text{O}_4$, solid solutions of Co compound-doped $\gamma\text{-Fe}_2\text{O}_3$ and Co compound-doped $\text{Fe}_3\text{O}_4$, ferromagnetic oxide powder. e.g., $\text{CrO}_2$, Fe—Co—Ni alloys, Fe—Al alloys, Mn—Bi alloys, Fe—Al—P alloys, Fe—Co—Ni—Cr alloys, Fe—Ni—Zn alloys, Fe—Co—Ni—P alloys, Fe—Ni alloys, Co—Ni alloys, Co—P alloys, Fe—Mn—Zn alloys, and Fe—Ni—Cr—P alloys.

In particular, the present invention can be excellently applied to dispersion of a magnetic powder composed of fine particles adaptable for a high recording density, and is effective in the case where an acicular ferromagnetic metal powder having an average major-axis length of 100 n=or less, especially, of 40 to 80 nm, is used as the magnetic powder. If the average major-axis length exceeds 150 nm, undesirably, the electromagnetic transducing characteristic (particularly, S/N characteristic and C/N characteristic) required of the magnetic recording medium tends to become unsatisfied. Hexagonal iron oxide powders, e.g., barium ferrite, may be used. Preferably, the plate ratio of the hexagonal iron oxide powder is 2 to 7. Preferably, the average primary plate diameter determined by TEM observation is 10 to 50 nm. If the diameter is large, the surface property of the magnetic layer tends to deteriorate.

With respect to a method for measuring the average major-axis length, the magnetic powder is taken by separating from a piece of tape, a photograph is taken with a transmission electron microscope (TEM), major-axis lengths of the powder are measured based on the resulting photograph and, thereby, the average value is determined. An example of the procedure thereof will be described below. (1) A back coating layer is wiped off with a solvent and, therefore, is removed from a piece of tape. (2) The tape specimen including a non-magnetic layer as a lower layer and a magnetic layer as an upper layer remaining on a non-magnetic support is immersed in a 5 percent-NaOH solution, and heating and agitation are carried out. (3) Coating films dropped off the non-magnetic support are washed with water, followed by drying. (4) The resulting coating films are subjected to an ultrasonic treatment in methyl ethyl ketone (MEK), and a magnetic powder is collected by attraction through the use of a magnet stirrer. (5) A magnetic powder is separated from the residue, followed by drying. (6) The magnetic powders resulting from the steps (4) and (5) are taken into respective meshes for their exclusive uses, specimens for TEM are prepared, and photographs are taken with TEM. (7) major-axis lengths of the magnetic powders in the photographs are measured and average values are determined (the number of measurements: n=100).

Preferably, the content of the above-described ferromagnetic powder in the composition of the magnetic layer is about 70 to 90 percent by mass. If the content of the ferromagnetic powder is too large, the content of the binder is decreased and, thereby, the surface roughness resulting from calendering tends to deteriorate. On the other hand, if the content is too small, the playback output is resistant to increasing.

Resin materials suitable for use as the binder are known thermoplastic resins, thermosetting resins, radiation-curing resins, and mixtures thereof, and are not specifically limited.

Examples thereof include vinyl chloride-epoxy copolymers, vinyl chloride-vinyl acetate copolymers, vinyl chloride-vinylidene chloride copolymers, cellulose resins, epoxy resins, polyester resins, polyurethane resins, polyvinyl butyral resins, synthetic rubber resins, and the like. These are resin materials serving as binders generally used for magnetic recording media.

The contents of these binder resins used for magnetic layers are 5 to 40 parts by weight relative to 100 parts by weight of magnetic powder and, in particular, is preferably 10 to 30 parts by weight. If the content of the binder resin is too small, the strength of the magnetic layer is decreased and, thereby, the running durability tends to deteriorate. On the other hand, if too large, the content of the magnetic powder is decreased and, thereby, the electromagnetic transducing characteristic deteriorates.

Examples of cross-linking agents to cure these binder resins include various known polyisocyanates in the case of a thermosetting resin. Preferably, the content of this cross-linking agent is 10 to 30 parts by weight relative to 100 parts by weight of binder resin. If necessary, a dispersing agent, a lubricant, an abrasive, an antistatic agent, a curing agent, and the like may be added to the magnetic layer. In general, these are used by being added to the magnetic paints.

Examples of organic solvents used as the solvent may include methyl ethyl ketone (MEK), methyl isobutyl ketone, toluene, cyclohexanone, ethyl acetate, tetrahydrofuran, and the like. These are suitable for dissolving the resin material of the binder, and may be used alone or as a mixture without specific limitation. Preferably, the amount of addition of the organic solvent is about 100 to 2000 parts by weight relative to 100 parts by weight of the total amount of solids (magnetic powder, binder resin, dispersant and the like) other than the organic solvent.

In the present invention, the thickness of the magnetic layer may be 0.50 µm or less, preferably, is 0.01 to 0.50 µm, and more preferably, is 0.02 to 0.30 µm. If the magnetic layer is too thick, the self-demagnetization loss and the thickness loss are increased. On the other hand, if too thin, the playback output is decreased.

Examples of non-magnetic powders used for the non-magnetic layer may include various inorganic powders, and preferably include acicular non-magnetic powders, e.g. acicular non-magnetic iron oxide ($\alpha$-$Fe_2O_3$). In addition to this, various non-magnetic powders, e.g., calcium carbonate ($CaCO_3$), titanium oxide ($TiO_2$), barium sulfate ($BaSO_4$), and $\alpha$-alumina ($\alpha$-$Al_2O_3$), may appropriately be blended. Preferably, carbon black is used for the nonmagnetic layer. Examples of the carbon black may include furnace black for rubber, thermal black for rubber, black for color, and acetylene black.

Preferably, the blend ratio of the carbon black to the inorganic powder is 100/0 to 10/90 in terms of a weight ratio. If the blend ratio of the inorganic powder exceeds 90, a problem of surface electrical resistance tends to occur.

Resins similar to those for the magnetic layer may appropriately be used as the binder for the non-magnetic layer without specific limitation. An abrasive, a dispersing agent, and other various additives may be added as in the case of the magnetic layer. The non-magnetic paint may be prepared by using an organic solvent as in the above-described magnetic layer at the same level of the amount of addition.

Preferably, the thickness of the non-magnetic layer is 2.5 µm or less, and more preferably, is 0.1 to 2.3 µm. Even when this thickness is increased to more than 2.5 µm, no improvement in the performance can be expected, and furthermore, the thickness tends to become uneven when the coating film is provided. If the thickness is less than 0.1 µm, the capability of the non-magnetic layer to supply the lubricant to the magnetic layer is reduced and, therefore, the durability tends to deteriorate.

If necessary, the back coating layer may be provided in order to improve the running stability, to prevent electrical charging of the magnetic layer, and the like, and is not essential in the present invention. Preferably, 30 to 80 percent by mass of carbon black is contained in the back coating layer. The carbon black may be any carbon black which is generally used, and carbon black similar to that used in the above-described non-magnetic layer may be used. Besides the carbon black, if necessary, non-magnetic inorganic powder, e.g., various abrasives, used for the magnetic layer; dispersing agents, e.g., surfactants; lubricants, e.g., higher aliphatic acids, aliphatic acid esters, and silicone oil; and other various additives may be added.

The thickness of the back coating layer (after calendering) is 0.1 to 1.0 µm and, preferably, is 0.2 to 0.8 µm. If this thickness exceeds 1.0 µm, the friction between the layer and the medium sliding contact path becomes too large and, thereby, the running stability tends to be reduced. On the other hand, if the thickness is less than 0.1 µm, shaving of the coating film of the back coating layer tends to occur during the running of the medium.

The non-magnetic support made of a known material may appropriately be used. Examples of known materials include polyesters, e.g., polyethylene terephthalate (PET) and polyethylene naphthalate (PEN), polyolefins, polyamide, polyimide, polyamide-imide, polysulfone, cellulose triacetate, and polycarbonate. The thickness thereof and the like may appropriately be determined within known ranges, and are not specifically limited.

An application method used for forming the non-magnetic layer and the magnetic layer by sequentially applying the non-magnetic paint and the magnetic paint to a thin support made of PET or the like is not specifically limited. Examples of usable method include an extrusion coating method, a reverse roll coating method, a gravure roll coating method, a knife coating method, a doctor blade coating method, a kiss coating method, a collar coating method, a slide bead coating method, and the like. Among them, the extrusion coating method is particularly suitable from the viewpoint of the uniformity of the coating film thickness.

EXAMPLES

The following examples are given for the purpose of illustration of this invention and are not intended as limitations thereof.

<Non-magnetic Paint Composition to Form Non-magnetic Layer>

| | |
|---|---|
| non-magnetic powder: $\alpha$-$Fe_2O_3$ (manufactured by TODA KOGYO CORP., average major-axis length 0.11 µm, BET specific surface area 57 m$^2$/g) | 70 parts by weight |
| carbon black: R760B (manufactured by Columbian Chemicals Company, average particle diameter 30 nm, BET specific surface area 63 m$^2$/g, DBP oil absorption 48 cc/100 g) | 30 parts by weight |
| electron beam (EB)-curing vinyl chloride copolymer (TB0246 manufactured by Toyobo Co., Ltd., degree of polymerization 300) | 10 parts by weight |

-continued

| | |
|---|---|
| EB-curing polyurethane resin (TB0242 manufactured by Toyobo Co., Ltd., Mn = 25,000) | 10 parts by weight |
| dispersing agent: phosphate (RE610 manufactured by TOHO CHEMICAL INDUSTRY CO., LTD.) | 2 parts by weight |
| α-Al$_2$O$_3$ (HIT-60A manufactured by Sumitomo Chemical Co., Ltd., average particle diameter 0.2 μm) | 5 parts by weight |
| methyl ethyl ketone | 100 parts by weight |
| toluene | 100 parts by weight |
| cyclohexanone | 90 parts by weight |

The non-magnetic powder and the like and the binder solution were subjected to an adequate kneading treatment with a kneader at a highly viscous state in the condition in which a part of the organic solvent was not included in the above-described composition. An appropriate amount of the organic solvent was added and agitation was adequately carried out in a dissolver. Subsequently, a preliminary dispersion treatment was carried out at a dispersion circumferential velocity of 8.0 m/s for a residence time of 30 minutes in a dispersion device filled in with zirconia beads having an average particle diameter of 0.8 mm at a filling factor of 74 percent while recycled supply was conducted. The solid concentration of the mixed solution at this time was 32 percent by mass.

The resulting mixed solution was diluted by further adding the solvent, and a main dispersion treatment was carried out for a residence time of 10 minutes in a manner similar to that described above. The resulting solution was subjected to a filtration treatment with a filter having a 100 percent-filtration accuracy of 1 μm, so that non-magnetic paint was prepared. The solid concentration of this paint was 30 percent by mass. This non-magnetic paint was applied to a non-magnetic support made of PEN having a thickness of 6.2 μm in order that the non-magnetic layer had a thickness of 2.0 μm after drying, and a drying treatment and a surface calendering treatment were carried out. Thereafter, an EB curing treatment was carried out so as to form the non-magnetic layer. In this manner, a raw element with a coating of the non-magnetic layer was prepared.

Examples 1 to 4

Magnetic paint having the following composition was prepared by the use of a pin-type mill shown in FIG. 2 as a dispersion device in accordance with the following procedure under dispersion conditions (average particle diameter of dispersion media (beads), dispersion circumferential velocity, and filling factor) shown in Table 1 below. Magnetic layers were formed from the magnetic paint prepared with varying dispersion times in each case, the surface roughness was measured, and a dispersion time, at which the surface roughness did not change anymore with time (that is, adequate dispersion state was established), was determined, and the resulting time was adopted as the residence time.

<Magnetic Paint Composition to Form Magnetic Layer>

| | |
|---|---|
| ferromagnetic metal powder (Fe/Co/Al/Y = 100/24/5/8 (weight ratio), Hc = 146 kA/m(1850 Oe), σs = 130 Am$^2$/kg (emu/g), average major-axis length 100 nm) | 100 parts by weight |

-continued

| | |
|---|---|
| vinyl chloride-epoxy copolymer resin (MR110 manufactured by ZEON Corporation) | 10.0 parts by weight |
| polyester polyurethane resin (UR-8300 manufactured by Toyobo Co., Ltd.) | 10.0 parts by weight |
| α-alumina (HIT-60A manufactured by Sumitomo Chemical Co., Ltd.) | 10 parts by weight |
| dispersing agent: phosphate (RE610 manufactured by TOHO CHEMICAL INDUSTRY CO., LTD.) | 2 parts by weight |
| methyl ethyl ketone | 190 parts by weight |
| toluene | 190 parts by weight |
| cyclohexanone | 580 parts by weight |

The magnetic powder and the like and the binder solution were subjected to an adequate kneading treatment with a kneader at a highly viscous state in the condition in which a part of the organic solvent was not included in the above-described composition. An appropriate amount of the organic solvent was added and agitation was adequately carried out in a dissolver. Subsequently, a preliminary dispersion treatment was carried out at a dispersion circumferential velocity of 8.0 m/s for a residence time of 30 minutes in a dispersion device filled in with zirconia beads having an average particle diameter of 0.8 mm at a filling factor of 74 percent while recycled supply was conducted. The solid concentration of the mixed solution at this time was 30 percent by mass.

The resulting mixed solution was diluted by further adding the solvent, so that the solid concentration was adjusted at 12 percent by mass. Subsequently, a main dispersion treatment was carried out under the conditions shown in Table 1 below in a manner similar to that described above. The residence time was determined based on the above-described manner, and was 10 minutes. With respect to the following Examples and Comparative examples, the residence times were determined in the same manner.

The resulting solution was mixed with 3.3 parts by weight of curing agent, and a filtration treatment was carried out with a filter having a 100 percent-filtration accuracy of 1.0 μm, so that magnetic paint was prepared. This magnetic paint was applied to the raw element with a coating of the non-magnetic layer. Subsequently, a magnetic orientation treatment, a drying treatment, and a surface calendering treatment were carried out, so that a magnetic layer was prepared.

In order to evaluate the surface roughness of the surface of the resulting magnetic layer, an atomic force microscope (AFM) AutoProbe M5 manufactured by Thermo Microscopes was used, and an AFM surface roughness Ra was determined under the following conditions with respect to the sample of this surface. The results thereof are also shown in Table 1.

the number of analyses; n=3 probe; silicon single crystal probe (manufactured by NANOSENSORS)

scan mode; non-contact mode scan area; 10×10 μm the number of pixels; 512×512 data points scan rate; 0.6 Hz measurement environment; room temperature, in air data processing; skew correction based on quadric was carried out in both the vertical and horizontal directions with respect to data of the entire image.

Examples 5 to 8

Each of magnetic layers was formed in a manner similar to that in Example 1 and the like except that a ferromagnetic metal powder having an average major-axis length of 85 nm was used, and the conditions of the main dispersion treatment were in accordance with the average particle diameter of beads, the dispersion circumferential velocity, the filling factor of beads, the residence time, and the dispersion device, each shown in Table 1. The AFM surface roughness Ra was determined as in Example 1 and the like with respect to the sample of this surface. The results thereof are also shown in Table 1.

Comparative Example 1 and Examples 9 to 11

Each of magnetic layers was formed in a manner similar to that in Example 1 and the like except that a ferromagnetic metal powder having an average major-axis length of 75 nm was used, and the conditions of the main dispersion treatment were in accordance with the average particle diameter of beads, the dispersion circumferential velocity, the filling factor of beads, the residence time, and the dispersion device, each shown in Table 1. The AFM surface roughness Ra was determined as in Example 1 and the like with respect to the sample of this surface. The results thereof are also shown in Table 1.

Comparative Examples 2 and 3 and Examples 12 and 13

Each of magnetic layers was formed in a manner similar to that in Example 1 and the like except that a ferromagnetic metal powder having an average major-axis length of 60 nm was used, and the conditions of the main dispersion treatment were in accordance with the average particle diameter of beads, the dispersion circumferential velocity, the filling factor of beads, the residence time, and the dispersion device, each shown in Table 1. The AFM surface roughness Ra was determined as in Example 1 and the like with respect to the sample of this surface. The results thereof are also shown in Table 1.

Comparative Examples 4 to 6 and Examples 14 and 15

Each of magnetic layers was formed in a manner similar to that in Example 1 and the like except that a ferromagnetic metal powder having an average major-axis length of 45 nm was used, and the conditions of the main dispersion treatment were in accordance with the average particle diameter of beads, the dispersion circumferential velocity, the filling factor of beads, the residence time, and the dispersion device, each shown in Table 1. The AFM surface roughness Ra was determined as in Example 1 and the like with respect to the sample of this surface. The results thereof are also shown in Table 1.

TABLE 1

|  | Average major-axis length of magnetic powder [nm] | Average particle diameter of beads [mm] | Residence time [min] | Dispersion circumferential velocity [m/sec] | Filling factor of Beads [%] | AFM Ra [nm] | Roughness judgment |
|---|---|---|---|---|---|---|---|
| Example 1 | 100 | 0.8 | 10 | 8.0 | 74 | 4.8 | ○ |
| Example 2 | 100 | 0.65 | 10 | 8.0 | 74 | 4.8 | ○ |
| Example 3 | 100 | 0.5 | 10 | 8.0 | 74 | 4.8 | ○ |
| Example 4 | 100 | 0.3 | 20 | 8.0 | 85 | 4.6 | ○ |
| Example 5 | 85 | 0.8 | 10 | 8.0 | 74 | 4.3 | Δ |
| Example 6 | 85 | 0.65 | 10 | 8.0 | 74 | 4.1 | ○ |
| Example 7 | 85 | 0.5 | 10 | 8.0 | 74 | 4.1 | ○ |
| Example 8 | 85 | 0.3 | 20 | 8.0 | 85 | 4.0 | ○ |
| Comparative example 1 | 75 | 0.8 | 10 | 8.0 | 74 | 3.9 | x |
| Example 9 | 75 | 0.65 | 10 | 8.0 | 74 | 3.7 | Δ |
| Example 10 | 75 | 0.5 | 10 | 8.0 | 74 | 3.5 | ○ |
| Example 11 | 75 | 0.3 | 20 | 8.0 | 85 | 3.4 | ○ |
| Comparative example 2 | 60 | 0.8 | 10 | 8.0 | 74 | 3.8 | x |
| Comparative example 3 | 60 | 0.65 | 20 | 8.0 | 74 | 3.6 | x |
| Example 12 | 60 | 0.5 | 30 | 8.0 | 74 | 3.3 | Δ |
| Example 13 | 60 | 0.3 | 30 | 8.0 | 85 | 3.1 | ○ |
| Comparative example 4 | 45 | 0.8 | 10 | 8.0 | 74 | 3.8 | x |
| Comparative example 5 | 45 | 0.65 | 20 | 8.0 | 74 | 3.5 | x |
| Comparative example 6 | 45 | 0.5 | 30 | 8.0 | 74 | 3.3 | x |
| Example 14 | 45 | 0.3 | 30 | 8.0 | 85 | 3.0 | ○ |
| Example 15 | 45 | 0.1 | 20 | 12.0 | 85 | 3.0 | ○ |

Figure 4:
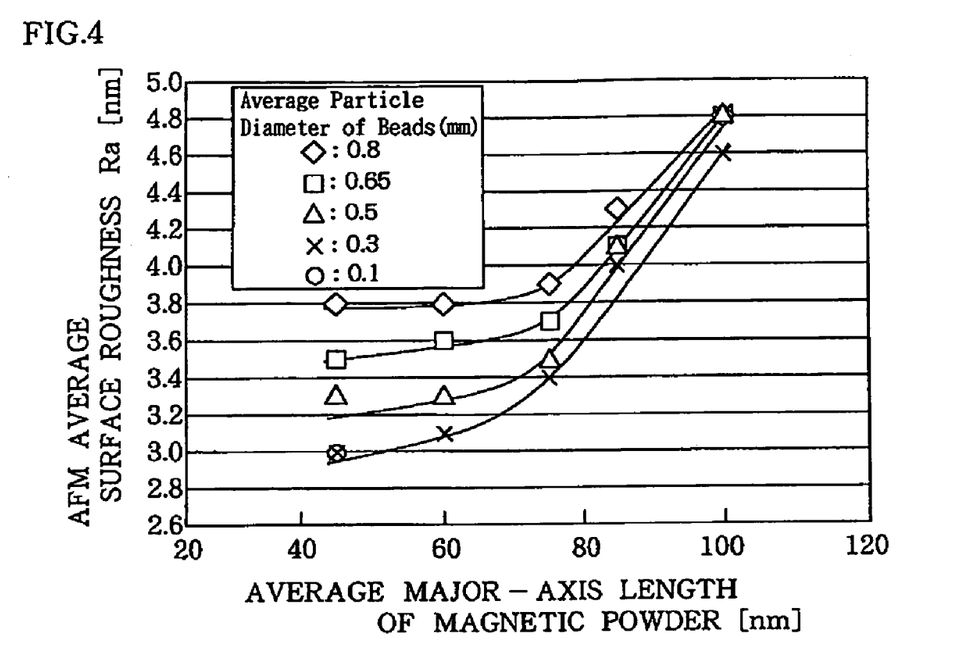
FIG. 4 is a graph showing the value of the AFM average surface roughness Ra corresponding to the average major-axis length of the magnetic powder with respect to each average particle diameter of beads.
Figure 5:
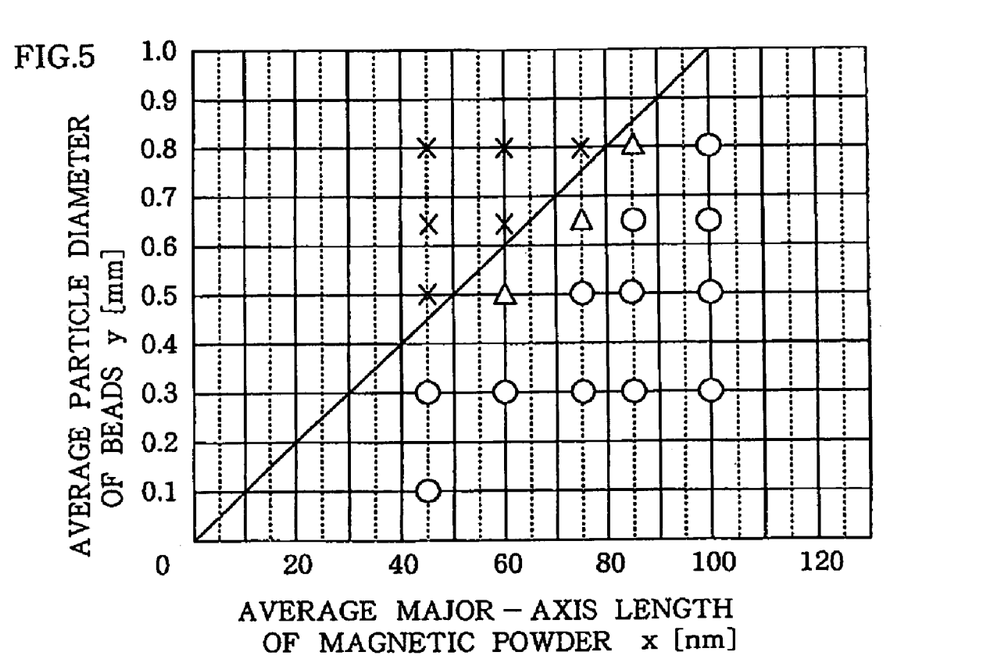
FIG. 5 is a graph showing the judgment results of the roughness.

With respect to the evaluation criteria of the AFM average surface roughness Ra of the magnetic layer shown in Table 1, when magnetic powders having the same average major-axis length were used, the best roughness among the roughness resulting from the use of beads having respective average particle diameters was taken as a reference value of roughness, and the roughness exhibited the degree of deterioration of less than 5 percent relative to the reference value of roughness was indicated by ○, the roughness exhibited that of at least 5 percent and less than 10 percent was indicated by Δ, and the roughness exhibited that of at least 10 percent was indicated by x. When the roughness is deteriorated by at least 10 percent, the tape characteristics (an error rate and the like) are adversely affected by a large degree. Consequently, ○ and Δ were evaluated as good, and x was evaluated as no good. FIG. 4 is a graph showing the value of the AFM average surface roughness Ra corresponding to the average major-axis length of the magnetic powder with respect to each average particle diameter of beads. FIG. 5 is a graph showing the judgment results of the roughness. In FIG. 5, a straight line indicates a graph of y=0.01x.

What is claimed is:

1. A method for manufacturing magnetic paint, which comprises:
   subjecting a magnetic paint to a preliminary dispersion step in the presence of a dispersion media to obtain a dispersed concentrated magnetic paint, the concentrated paint comprising at least one binder, at least one solvent, a magnetic powder, and a dispersion agent,
   adding at least one solvent to the concentrated paint to obtain a dispersed magnetic paint;
   subjecting the dispersed magnetic paint to a main dispersion step;
   and subsequently filtering to obtain the magnetic paint;
   wherein the dispersion media in the main disperson step have an average particle diameter y (mm) that satisfies the following relationship,
   $y \leqq 0.01x$;
   where x is an average maximum diameter x(nm) of the magnetic powder.

2. The method for manufacturing magnetic paint according to claim 1, wherein the magnetic powder is an acicular ferromagnetic metal powder and the average maximum diameter of 100 nm or less.

3. The method for manufacturing magnetic paint according to claim 1, wherein the magnetic powder is an acicular ferromagnetic metal powder and the average maximum diameter x is an average major-axis length.

4. The method for manufacturing magnetic paint according to claim 1, wherein the dispersion media used in the main dispersion step have an average particle diameter y of 0.8 mm or less.

5. The method for manufacturing magnetic paint according to claim 1, wherein the dispersed magnetic paint has a concentration of 5 to 20 percent by mass in terms of a dispersed solid based on the total mass of the dispersed magnetic paint.

6. The method for manufacturing magnetic paint according to claim 1, wherein the filtering removes particles larger than 2.0 μm.

7. The method for manufacturing magnetic paint according to claim 1, wherein the filtering removes particles larger than 1.0 μm.

8. The method for manufacturing magnetic paint according to claim 1, wherein the dispersion media in the main disperson step satisfies the following relationship, $y \leqq 0.008x$.

* * * * *